Oct. 17, 1950 R. K. KALLIO 2,526,366
ADJUSTABLE DAYLIGHT FILM DEVELOPING TANK
Filed May 4, 1948 6 Sheets-Sheet 1

INVENTOR.
RICHARD K. KALLIO
BY
ATTORNEY

Oct. 17, 1950 R. K. KALLIO 2,526,366
ADJUSTABLE DAYLIGHT FILM DEVELOPING TANK
Filed May 4, 1948 6 Sheets-Sheet 5

INVENTOR.
RICHARD K. KALLIO
BY
Karl W. Woodward
ATTORNEY

Oct. 17, 1950   R. K. KALLIO   2,526,366
ADJUSTABLE DAYLIGHT FILM DEVELOPING TANK
Filed May 4, 1948   6 Sheets-Sheet 6

INVENTOR.
RICHARD K. KALLIO
BY
ATTORNEY

Patented Oct. 17, 1950

2,526,366

UNITED STATES PATENT OFFICE 2,526,366

ADJUSTABLE DAYLIGHT FILM DEVELOPING TANK

Richard K. Kallio, Washington, D. C.

Application May 4, 1948, Serial No. 24,961

6 Claims. (Cl. 95—90)

This invention relates to a developing tank used by photographers while developing films and it is one object of the invention to provide a tank of such construction that during a developing operation it is not necessary to exclude daylight from the developing room.

Another object of the invention is to provide a developing tank having mounted therein a frame in which spacers for holding film out of contact with each other are mounted, the frame being readily removable from the tank so that the tank may be thoroughly cleaned and the spacers being also spacers, also removed and cleaned.

Another object of the invention is to provide a frame of such construction that while elements forming the same may be easily taken apart they will be firmly held in assembled relation to each other and not be liable to move out of their proper positions.

Another object of the invention is to provide a frame having side walls forming tracks in which film are engaged when deposited in a tank for development, the tracks being spaced from each other in order that the spacers may be fitted into the frame and films held in predetermined spaced relation to each other.

Another object of the invention is to provide a frame having its side walls detachably engaged at their ends with cross bars, one of the side walls being shiftable along the cross bars to adjusted positions in order to dispose the side walls in predetermined spaced relation to each other and thus accommodate the frame to films of different sizes and insure engagement of edge portions of the films in the tracks of the side walls.

Another object of the invention is to provide an agitator which extends longitudinally in the frame and is slidably mounted in vertically extending guides so that it will be held against movement transversely of the tank but allowed to freely slide vertically and cause the films to be moved vertically in the tracks, the said agitator including a bar serving as a weight which rests upon upper edges of films and causes the films to return to their original position after having been raised by upward movement of the agitator and the agitator again lowered.

Another object of the invention is to provide an improved guide for directing films into the tracks of the frame when leading the developing tank, the guide being shiftable along the tank longitudinally the frame and having means for locating the guide directly over tracks of the frame as the guide is moved into position for individually feeding films into the tracks.

Another object of the invention is to provide a guide so framed that films may be rapidly fed into the tracks and the tank thus quickly loaded into a tank filled with developing fluid if desired and all of the films evenly developed.

Another object of the invention is to provide the tank with an improved cover having such interfitting engagement with walls of the tank that light will be prevented from entering the tank through space between walls of the tank and the cover.

Another object of the invention is to provide the cover and an end wall of the tank with interfitting extensions which form a pouring spout through which developing fluid may be poured from the tank without light entering the tank through the spout.

Another object of the invention is to provide the cover with an entrance through which developing fluid or setting fluid may be poured into the tank without light entering the tank through the entrance for the liquid.

Another object of the invention is to provide a developing tank which may have all of its elements formed of plastic which is not affected by the developing fluid poured into the tank.

With these and other objects the invention consists of a special construction and arrangement of parts illustrated in the accompanying drawings wherein:

Figure 1:
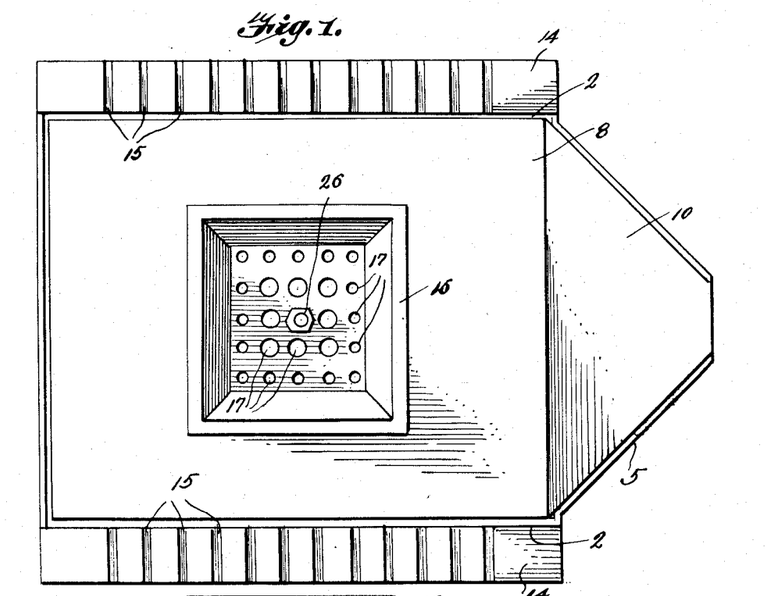
Fig. 1 is a top plan view of the improved developing tank with its cover in place.
Figure 2:
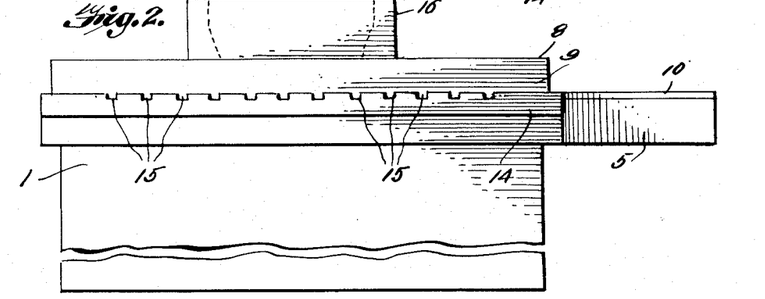
Fig. 2 is a side view of the improved tank.
Figure 3:
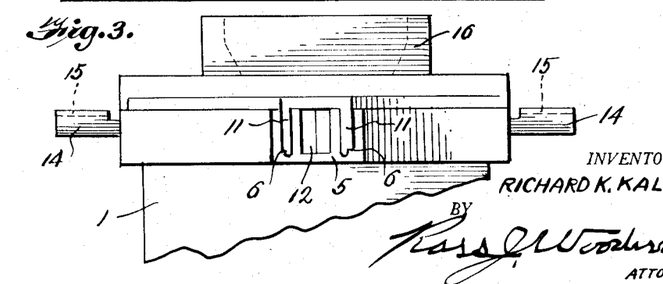
Fig. 3 is a view looking at the front end of the tank from which the pouring spout projects.
Figure 4:
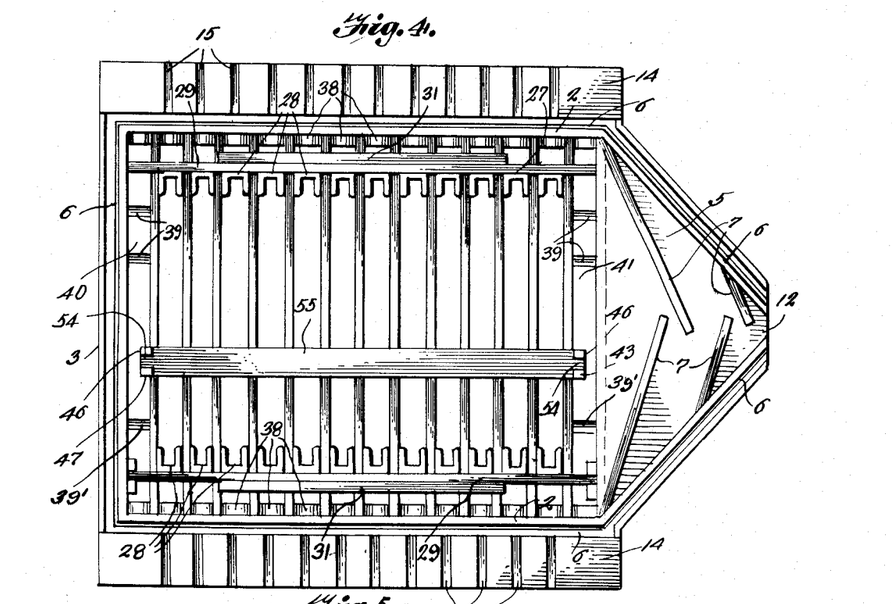
Fig. 4 is a top plan view of the tank with the cover removed.

The tank 1 may be of any dimension desired and has side walls 2 and end walls 3 and 4. Upper edge portions of the side walls and the rear wall 3 are thickened outwardly and the front wall carries a forwardly extending lip which is tapered towards the front end and bordered by upstanding flanges, the lip and its flanges defining a spout 5 so that developing fluid may be conveniently poured from the tank without removing the lid or cover of the tank. The thickened upper portions of the side walls and the rear wall are formed with a groove 6 having its end portions extending along opposite sides of the spout 5 within the flanges thereof. Plates 7 extend from opposite sides of the spout at a forward incline with their end portions overlapped, as shown in Figure 4, and serve as baffles which prevent light from passing inwardly through the open front end of the spout and reaching the interior of the tank when the cover 8 is applied to the tank. The cover has walls 9 along its side edges and its rear edge which fit into the portions of the channel 6 extending along the side walls and the rear wall of the tank, and from the front end of the cover projects a lip 10 having depending walls or flanges 11 which fit into the portions of the groove 6 extending along the side edge portions of the spout. The lower edge portions of the flanges 9 and 11 are reduced in thickness to form a narrow lip which fits into a groove 6' formed along the bottom of the channel 6 and assists in forming a light-proof seal as well as preventing liquid from escaping about to flange 11 while pouring liquid from the tank. By so forming the spout and the lip 10 of the cover, the spout will be entirely closed when the cover is applied except at the extreme front end of the spout where the spout is cut straight across to form a pouring opening 12. The ribs 13 of the lip 10 fit between the overlapped portions of the baffle photos 7 and corporate therewith to exclude light from the tank. Thickening of the upper portions of the walls of the tank not only allows the channel 6 to be formed about the tank but also provides good supports for flanges 14 which project outwardly along side walls of the tank and have their upper faces formed with transversely extending grooves 15 spaced from each other equal distances longitudinally of the flanges.

Figure 5:
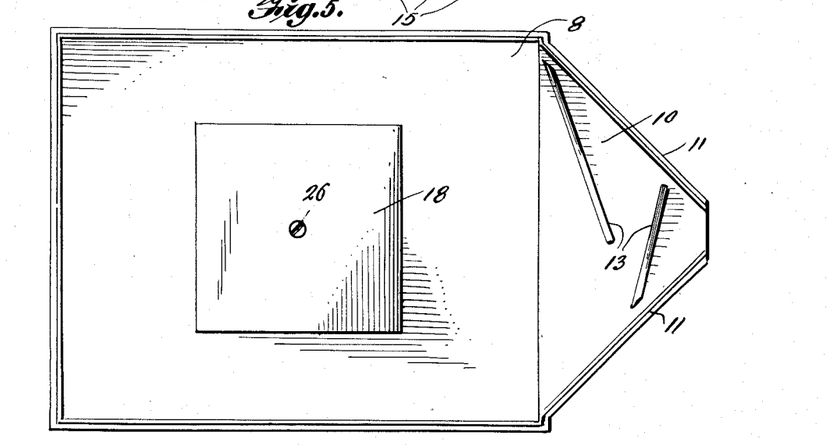
Fig. 5 is a view looking at the under face of the cover.
Figure 6:
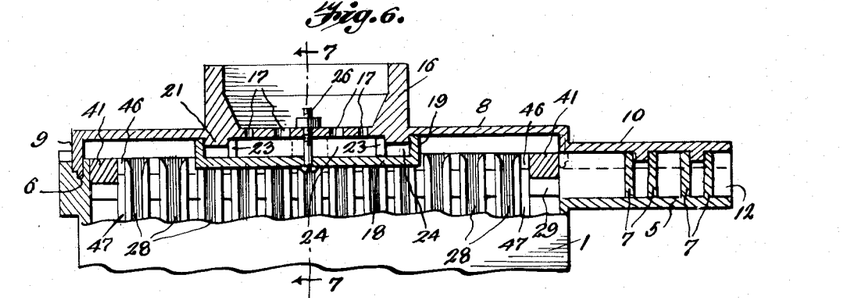
Fig. 6 is a sectional view taken longitudinally through the upper portion of the tank.
Figure 7:
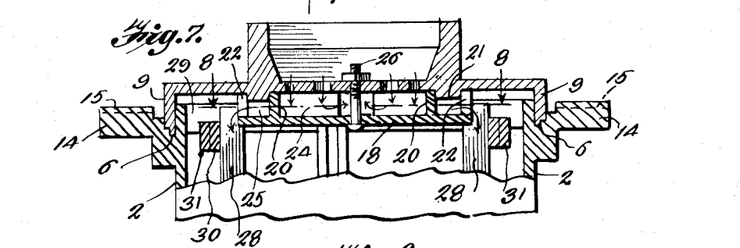
Fig. 7 is a transverse sectional view taken along the line 7—7 of Figure 6.
Figure 8:
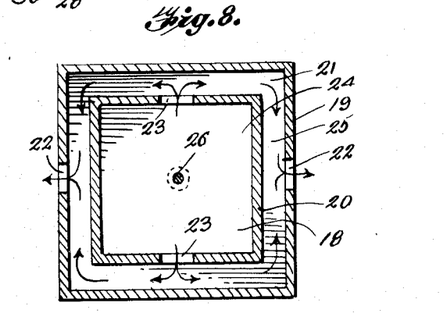
Fig. 8 is a sectional view taken along the line 8—8 of Figure 7.
Figure 9:
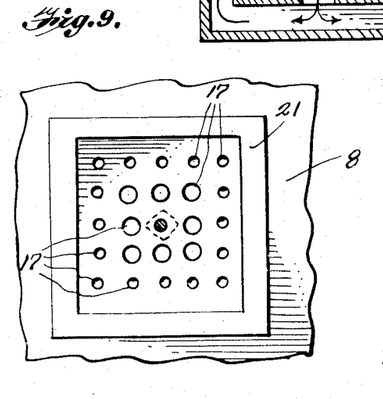
Fig. 9 is a view looking at the under face of the inlet through which developing fluid is poured into the tank.

If so desired the tank may be filled with developing fluid or a fixing fluid without removing the cover and in order to do so there has been provided a well 16 which has been shown of rectangular shape and projects upwardly from the cover 8 about a plurality of openings 17. Lower portions of the walls of the well are inwardly thickened and have their inner surfaces sloping as shown in Figures 5 and 7 so that the well is substantially funnel-shaped and the liquid will be directed towards the openings 17. A shield 18 having side walls 19 and an inner flange 20 extending parallel to the walls 18 is fitted against the under face of the cover about the portion of the cover through which the perforations 17 are formed and is held against transverse movement out of its proper position in shielding relation to the perforations or openings by a rib 21 which extends downwardly from the cover and conforms to the contour of the inner flange 20. This rib fits snugly into the space or channel between the flange 20 and the outer flange or wall 19 of the shield but is spaced upwardly from the bottom of the channel. Openings 22 and 23 are formed through the flanges 19 and 20, the openings 22 and 23 extending at right angles to each other so that when liquid is poured into the well and flows through the openings 17 into the cup 24 defined by the shield it must flow through the openings 23 to reach the channel 25 between the flanges of the shield and then flow along this channel in order to reach the openings 22 through which it flows into the tank. As the openings 22 and 23 are not opposite each other light may not reach the interior of the tank. A bolt 26 which is passed upwardly through the center of the shield and through an opening at the center of the perforated bottom of the well and securely holds the shield in place with the upper edges of the flanges 19 and 20 bearing against the under face of the cover but allows the shield to be removed when cleaning is necessary. The shield does not interfere with flow of developing liquid into the tank but very effectively excludes light and the tank may therefore be filled or liquid added when necessary without taking the tank into a dark room or turning off lights in a dark room.

A removable frame fits within the tank and has side walls 27 formed of vertically extending bars 28 spaced transversely from each other and having their upper end portions secured against inner surfaces of flat strips 29 which extend longitudinally of the side walls and at their ends carry depending strips 30. The bars 28 are of channeled shape in cross section and form tracks into which opposite side edge portions of films fit when the films are fed into the tank, and the films will therefore be held in upright position in the tank. Strips 31 which are of less length than the bars or strips 29 are mounted horizontally against outer side faces thereof and serve to reinforce these bars and also allow them to be readily grasped when the side walls are to be fitted into or removed from the tank. Side flanges 32 which project inwardly from upper ends of the strips 30 are secured against side faces of end ones of the vertical bars or tracks 28 and serve to reinforce the vertical strips at their junction with the strips 29. The side walls are of such length that they may be shifted vertically into and out of the tank and one wall has its end strips 30 engaged in grooves or seats 33 formed by ribs 34 which extend vertically upon the front and rear walls of the tank in transverse spaced relation to each other. This side wall may be referred as permanently located side wall and the other as an adjustable side wall as it is to be moved to adjusted positions in predetermined spaced relation to the stationary side wall and thus allow films of different width to be deposited in the frame with their side edge portions engaged in the channel shaped tracks or bars 28.

Figure 10:
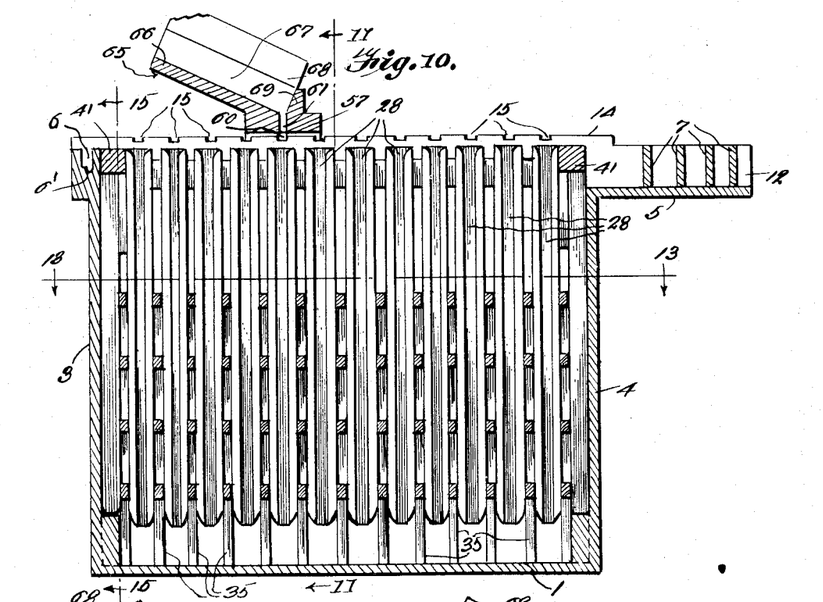
Fig. 10 is a sectional view taken longitudinally through the tank with the cover removed and a film guide applied to the tank.
Figures 11, 12:
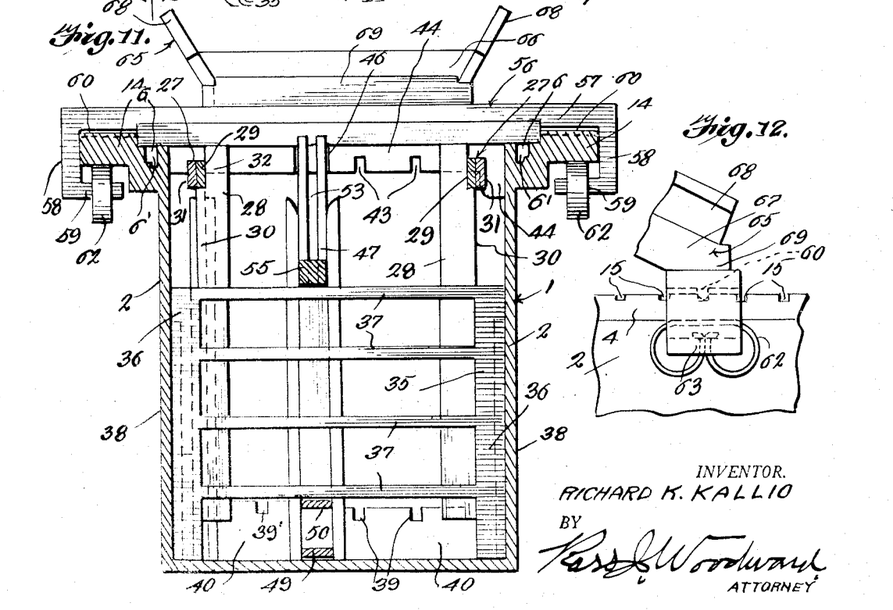
Fig. 11 is a transverse sectional view taken along the line 11—11 of Figure 10.
Fig. 12 is a fragmentary view looking at one end of the film guide.
Figure 13:
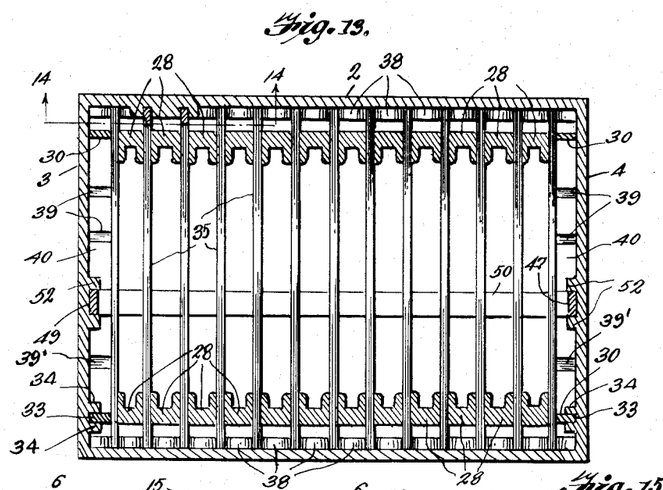
Fig. 13 is a longitudinal sectional view taken horizontally through the tank along the line 13—13 of Figure 10.
Figure 14:
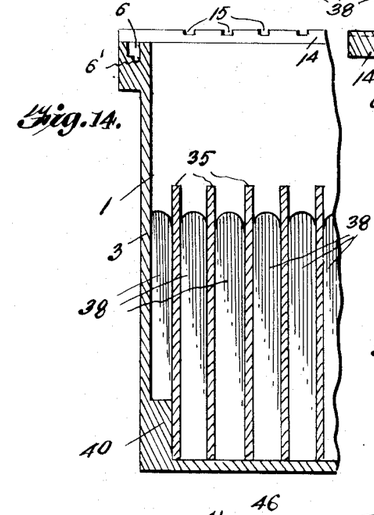
Fig. 14 is a fragmentary sectional view taken along the line 14—14 of Figure 13.
Figure 15:
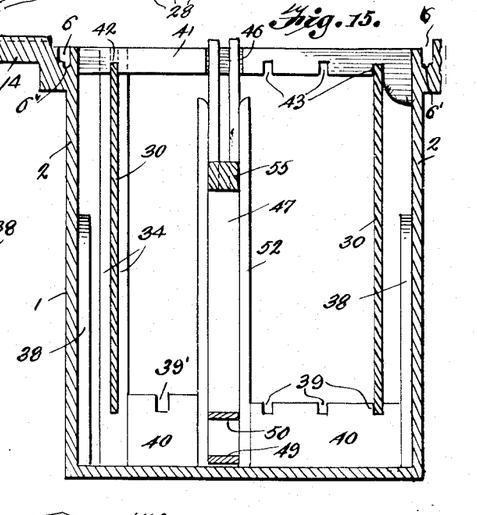
Fig. 15 is a transverse sectional view taken along the line 15—15 of Figure 10.
Figure 16:
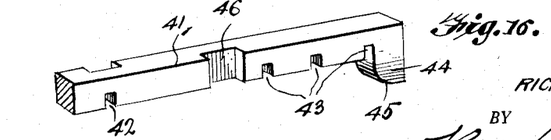
Fig. 16 is a perspective view of a portion of one of the cross bars which held the side walls of the frame in desired spaced relation to each other.
Figures 17, 18, 19, 20:
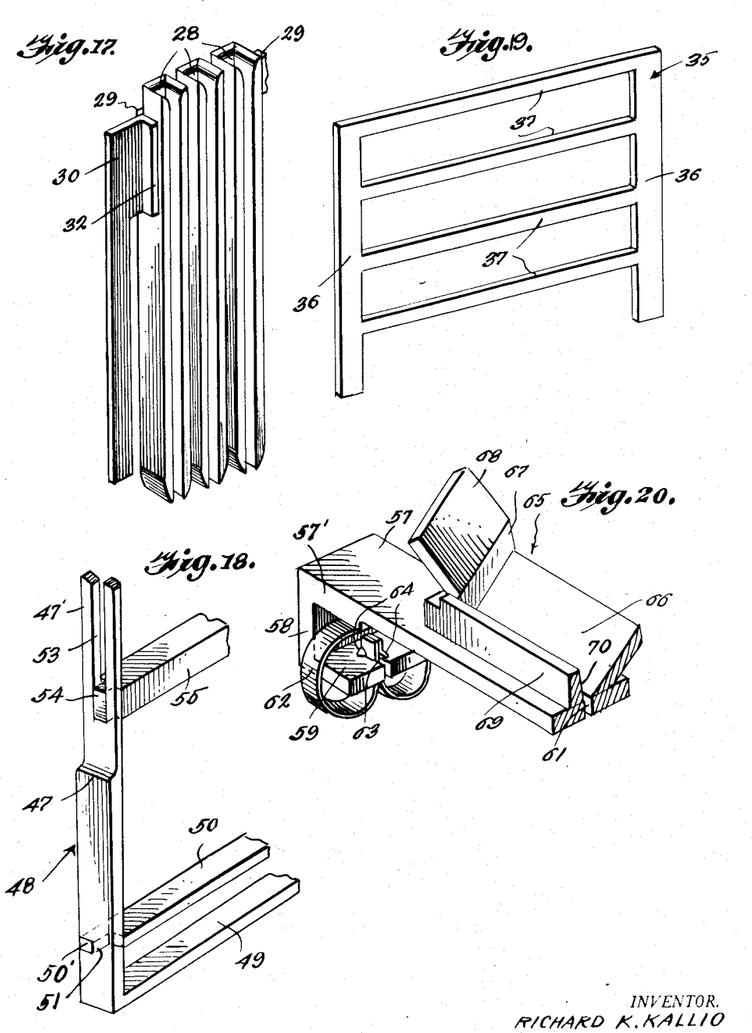
Fig. 17 is a perspective view of an end portion of a side wall of the frame.
Fig. 18 is a perspective view of an end portion of a yoke carrying a bar which is slidable vertically through the yoke and its bar constituting means for agitating films vertically in the tank and thus causing the developing fluid to be thoroughly mixed and the films to be evenly developed.
Fig. 19 is a perspective view of one of the spacers which held films out of contact with each other.
Fig. 20 is a perspective view of an end portion of a guide by means of which films are directed into tracks of the side walls of the frame.

The films must be prevented from having face to face contact with each other and in order to do so there have been provided a plurality of spacers 35 formed as shown in Figure 19. Each of these spacers has end bars or strips 36 between which extend cross bars or strips 36 spaced vertically from each other. These spacers are fitted into the tank before the side walls are set in place and extend the full width thereof with their end strips engaged in spaces between vertically extending ribs 38 provided along the inner faces of the side walls of the tank. Upper ends of the ribs are rounded so that cam surfaces will be formed for guiding the strips 36 into the spaces between the ribs. When the side walls of the frame are applied the spacers are disposed in the spaces between the bars or tracks 28, and upon referring to Figure 10 it will be seen that lower ends of the bars 28 are tapered in order to form sloping cam surfaces which will cause the spacers to readily enter the spaces between the track bars. Since the spacers are of such thickness that they fit loosely between the ribs 38 and the track bars 28, the spacers and the side walls of the frame may be very easily thrust downwardly into the tank and this also allows the spacers to be easily shifted upwardly and downwardly in the tank and thus serve to agitate developing fluid and keep it thoroughly mixed so that films will be evenly developed.

When the side walls 27 are thrust downwardly into the tank lower ends of their end strips 30 engage in notches 39 formed in blocks 40 extending transversely of the lower ends of the end walls of the tank. The guide strips 34 are located at opposite sides of the notches into which the stationary side wall fits but corresponding guide strips for the adjustable side wall have been omitted so that the adjustable side wall may be easily shifted transversely of the tank and then thrust downwardly into place. The side walls of the frame should be held parallel to each other so that the films may slide freely in the track bars 28 and in order to do so there have been provided bracing bars 41. These bracing bars extend transversely of the tank close to the end walls thereof and each is formed near one end with a notch 42 to receive the stationary side wall 27, the other end portion of the bracing bar being formed with a plurality of notches 43 for receiving the adjustable side wall. Arms 44 extend downwardly from the cross bars and at their lower ends have rounded surfaces so that the arms will slide easily along ends of the strips 29 when the cross bars are applied.

Inner side faces of the cross bars are formed with recesses 46 located midway their length to receive upper ends of the arms 47 of a yoke 48 which is fitted into the tank before the side walls and the spacers of the frame applied, and from an inspection of Figure 18 it will be seen that the arms 47 have their lower ends connected by a bridge 49 which holds the arms 47 parallel to each other. A bar 50 is spaced upwardly from the bridge 49 and has reduced ends 50 removably mounted in notches 51 formed in upwardly spaced relation to lower ends of the arms 47. The arms 47 fit between strips or ribs 52 which extend vertically along inner faces of the end walls of the tank and upper portions 47 of the arms are of reduced thickness so that the portions of the bars 41 formed with the recesses 46 may fit loosely between upper portions of the arms 47 and end walls of the tank and the arms of the yoke slide freely through the recesses. The upper portions of the arms 47 are formed with longitudinally extending slots 53 to loosely receive tongues 54 formed by reduced ends of a bar 55. This bar slides freely in the slots of the yoke arms and constitutes a weight which rests upon upper edges of film and urges its films downwardly to a position in which they are submerged in the developing fluid with which the tank is filled and all portions of the films will be properly developed. Since ends of the arms 47 of the yoke project above the cross bar 44, they may be gripped and vertical reciprocating movement imparted to the yoke. The spacers and the films are carried upwardly with the yoke and as the yoke moves downwardly the bar or weight 55 serves to force the films and the spacers downwardly and submerge the films in the developing fluid with which the tank is filled. Therefore the film will be agitated and be more evenly and clearly developed. When large films are to be developed the bar 50 is removed from the arms of the yoke and the films set at rest upon the bridge 49. When small films are to be developed they will rest upon the bar 50 so that upper ends of the films will project above the spacers and may be grasped for removing the films. If it is not desired to use the yoke the bar 50 will be removed and used without the yoke and have its reduced end portions 50' fitted into the notches 39'. The bar will hold the films raised and in position to be grasped at their upper edge portions for removal.

When the tank is loaded the cover 8 is removed and lights turned out or red lights used during the loading operation, the cover being then replaced so that light will be excluded and the films safely developed when lights are again turned on so that an operator may do other work while developing of the films takes place. During the loading operation the films are disposed transversely of the tank and slid downwardly into the track bars 28. In order to direct the films into the track bars and thus allow the tank to be quickly loaded there has been provided a guide 56 having a base portion or bar 57 which is of such length that it will extend entirely across the tank with its end portions resting upon upper faces of the flanges 14. Arms 58 extend downwardly beyond outer side edge faces of the flanges and at their lower ends carry lips or flanges 59 which extend inwardly under the flanges 14 in downwardly spaced relation thereto. End portions 571 of the bar are thickened downwardly and along under faces of these thickened portions extend ribs 60 which are located midway the width of the bar and of such dimensions that they will fit into the grooves 15 and hold the guide in set positions in which ends of a slot 61 formed longitudinally of the bar register with upper ends of track bars 28. Since the grooves 15 are directly over the track bars adjustment of the guide along the flanges 14 will always dispose the slot 61 over a set of track bars and as films pass downwardly through the slot they will drop into the track bars with which ends of the track register. The bar 57 of the guide must be held in close contacting engagement with the flanges 14 and frictionally grip the flanges so that it may be moved in step by step movements along the tank and clicking noises created as a signal that the guide has been moved into cooperating relation to the next set of track bars 23 after a film has been fed into the tank. In order to do so there have been provided springs 62. These springs are formed from strips of resilient metal and each strip extends across the upper face of a companion flange 59 with its end portions bent downwardly and then inwardly and thrust upwardly into a slot 63 formed in the flange longitudinally thereof. Ends of the resilient strips from which the springs are formed are cut and bent to form tongues 64 which overlap the flaps at opposite sides of the slots 63 and prevent the ends of the springs from slipping downwardly out of the slots and releasing the springs from the flanges. When a spring is applied one end is fitted into the slot 63 with its tongue disposed over the flange. The spring strip is then curled upwardly and across the upper face of the flange and then brought downwardly and under the flange with its extremity directed upwardly and fitted into the slot flat against the first end of the spring strip with its tongue disposed over the flange. The springs will thus have longitudinally curved, upwardly bowed portions extending across upper faces of the flanges 59 and these bowed portions of the springs will bear against lower faces of the flanges 14 and yieldably resist movement of the guide 56 along the tank from one adjusted position to another and clicking noises will be created as the ribs 60 drop into the grooves 15 which will act as an audible signal that the ribs 60 are engaged in grooves 15 and the guide in position for directing a film into a set of track bars. A mouth 65 has been provided for directing the films into the slot 61. This mouth consists of a plate 66 which extends at an incline upwardly and rearwardly from the bar 59 and is provided with side walls 67 along its opposite side so that films will be prevented from sliding transversely off of the plate edges. Upper portions of the side walls form wings 68 which extend outwardly at an upward incline and serve to guide films dropped upon the guide to a position in which they rest flat upon the plate 66. Care should be taken to so apply the films to the plate that one side edge of a film is in contact with a side wall and thus cause the films to be disposed in position to engage in the tracks of the two side walls when they pass through the slot in the guide bar. The films deposited upon the plate slide towards the lower end thereof and in order to insure passage of the films downwardly through the slot 61 there has been provided a wall or flange 69 which extends longitudinally of the bar 57 between front ends of the side walls of the guide and flush with the front edge of the slot. By having the inner side face 70 of the wall 69 leveled the film will be directed downwardly as it strikes this wall and in addition only the lower edge of the wall will bear against the film and scratching of the film will be avoided. It will thus be seen that the films may be easily and very quickly fed through the guide and into the developing tank while in a dark room, with lights extinguished in a dark room, after which the guide will be slid longitudinally of the flanges 14 until it reaches ends of these flanges and is entirely removed. The cover is then applied and lights may be turned on in the dark room and other work done while films in the tank are being developed by action of the fluid in the tank.

At intervals the lid of the tank may be removed after turning out the lights and upper ends of the yoke, arms may be grasped between the index finger to the thumb of both hands and gently raised and lowered a short distance. The movement of the film in the developer tends to dispel air bubbles, make for more evenly developed negatives, more contrast, and less grain. After the films have been in the developing fluid a sufficient length of time the developing fluid must be removed and a fixing or other fluid substituted. This may be accomplished without turning out lights in the dark room as the cover has light-proof engagement with the walls of the tank and its spout and the tank may therefore be tipped to cause developing fluid to flow out of the spout and setting fluid then poured into the well from which it flows into the tank without the films being exposed to light.

Having thus described the invention, what is claimed is:

1. In a photographic film developing apparatus, a frame of dimensions adapting it to be inserted into a tank through the open top thereof, said frame having side walls formed with vertically extending film-receiving tracks spaced transversely from each other, spacers disposed vertically in said frame and extending transversely of the frame with opposite end portions passing through the side walls between the tracks thereof.

2. In a photographic film developing apparatus, a frame of dimensions adapting it to be inserted into a tank, said frame having side walls and spacers disposed vertically in said frame and extending transversely of the frame between the side walls, the side walls including vertical film-receiving tracks spaced from each other, there being vertical spaces in the walls between said tracks through which end portions of the spacers pass, and one of said side walls being shiftable transversely of the frame and across side faces of the spacers to adjusted positions and thereby accommodate the frame to films of different widths.

3. In a photographic film developing apparatus, a frame of dimensions adapting it to be inserted into a tank through the open top thereof, said frame having side walls including vertical tracks spaced transversely from each other, vertical spacers extending transversely of the frame with end portions passing through spaces between the tracks and freely slidable vertically therein, a yoke extending longitudinally of said tank under the spacers and having upstanding arms disposed vertically intermediate the width of the frame and adapted to be grasped at their upper ends for reciprocating the yoke and the spacers vertically and agitating films and developing fluid in the tanks, the arms being formed with longitudinally extending slots leading from their upper ends, and a bar extending longitudinally in the frame over said spacers and constituting a weight for resting upon upper edges of films and forcing films downwardly into place after upward movements during reciprocating of the yoke and the spacers, said bar having its end portions formed with tongues engaged in the slots of the arms and mounting the bar for sliding movement vertically along the bars.

4. A photograph film developing apparatus comprising a tank open at its top and having a bottom and side and end walls, a frame in said tank having side walls including vertical tracks, spacers extending transversely of the frame and having end portions passing through the spaces between the tracks and freely shiftable vertically therein, end walls of the tank having lower portions formed with seats spaced from each other transversely of the tank and into which ends of lower edge portions of the side walls fit to removably mount the walls and allow shifting of one wall to a position in predetermined spaced relation to the other wall, and cross bars extending transversely of the tank at opposite ends thereof and formed with seats into which ends of upper edges of the side walls fit to assist in holding the side walls in desired spaced relation to each other.

5. A photograph film developing apparatus comprising a tank open at its top, a frame in said tank having side walls provided with vertical film-receiving tracks spaced transversely from each other, spacers extending transversely of the frame with end portions passing through spaces between the tracks and freely slidable therein, said spacers having end bars and cross bars extending between the end bars in vertical spaced relation to each other, ribs extending vertically upon side walls of the tank and between which the end bars of the spacers fit, for free sliding movement, a yoke having a bridge extending longitudinally of the tank along the bottom thereof and upstanding arms at its ends, ribs extending vertically along end walls of the tank midway the width of the tank and between which the arms of the yoke fit and are freely slidable vertically, said yoke constituting means for imparting vertical reciprocating movement to the spacers and agitating developing fluid in the tank; a bar extending longitudinally in the tank above the spacers and constituting a weight slidably engaged vertically along the arms of the yoke and serving to rest upon upper edges of films deposited in the tank between the spacers with their opposite edge portions engaged in the tracks of the side walls of the frame and force the films downwardly in the tank and cross bars extending transversely of the tank and the frame and having lower faces formed with notches into which upper edges of the side walls fit and with other notches in their inner side faces into which upper portions of the arms of the yoke fit.

6. In a photographic film developing apparatus, a frame of dimensions adapting it to be inserted into a tank through the open top of the tank, said frame having side walls formed of transversely spaced vertically extending channeled bars forming film-receiving tracks spaced transversely from each other and having upper portions connected by strips extending longitudinally of the side walls, spacers extending transversely of the frame between the side walls with opposite ends passing through spaces between the track-bars and freely slidable vertically therein, lower ends of the said track bars being formed with sloping side faces for guiding end portions of the spacers into the spaces between the track bars when thrusting the side walls into the tank, a yoke extending longitudinally of said frame under the spacers and having upstanding arms at its ends of a length adapting them to project upwardly from the frame and be grasped for reciprocating the yoke vertically and agitating the spacers and films inserted between the spacers, a bar extending longitudinally in the frame over said spacers and having its ends removably engaged with the upstanding arms of the yoke and slidable vertically thereon and constituting a weight for forcing films downwardly, and cross bars extending transversely of the frame and formed with notches into which fit upper edges of the side walls and upper portions of the arms of the yoke.

RICHARD K. KALLIO.

REFERENCES CITED

The following references are of record in the file of this patent:

UNITED STATES PATENTS

| Number | Name | Date |
|---|---|---|
| 1,027,626 | Pelton | May 28, 1912 |
| 2,190,754 | Carleton | Feb. 20, 1940 |
| 2,344,710 | McMurty | Mar. 21, 1944 |